(12) United States Patent
Ali et al.

(10) Patent No.: US 7,653,898 B1
(45) Date of Patent: *Jan. 26, 2010

(54) METHOD AND APPARATUS FOR GENERATING A CHARACTERISTICS MODEL FOR A PATTERN-BASED SYSTEM DESIGN ANALYSIS USING A SCHEMA

(75) Inventors: Syed M. Ali, Menlo Park, CA (US); Yury Kamen, Menlo Park, CA (US); Deepak Alur, Fremont, CA (US); John P. Crupi, Bethesda, MD (US); Daniel B. Malks, Arlington, VA (US); Rajmohan Krishnamurthy, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 992 days.

This patent is subject to a terminal disclaimer.

(21) Appl. No.: 11/133,714

(22) Filed: May 20, 2005

(51) Int. Cl.
   *G06F 9/44* (2006.01)
(52) U.S. Cl. .................. 717/122; 717/104; 717/120; 717/121; 717/123
(58) Field of Classification Search ......... 717/120–123, 717/104
See application file for complete search history.

(56) References Cited

U.S. PATENT DOCUMENTS

| | | |
|---|---|---|
| 5,664,173 A | 9/1997 | Fast |
| 5,752,245 A | 5/1998 | Parrish et al. |
| 5,911,139 A | 6/1999 | Jain et al. |
| 6,023,694 A | 2/2000 | Kouchi et al. |
| 6,430,553 B1 | 8/2002 | Ferret |
| 6,760,903 B1* | 7/2004 | Morshed et al. .............. 717/130 |
| 7,137,100 B2 | 11/2006 | Iborra et al. |
| 2001/0042067 A1 | 11/2001 | Dayani-Fard et al. |
| 2003/0200280 A1 | 10/2003 | Austin |
| 2004/0093344 A1* | 5/2004 | Berger et al. ................. 707/102 |
| 2004/0255291 A1 | 12/2004 | Sierer et al. |
| 2005/0044197 A1* | 2/2005 | Lai ............................ 709/223 |
| 2006/0112175 A1* | 5/2006 | Sellers et al. ............... 709/223 |
| 2006/0124738 A1 | 6/2006 | Wang et al. |

FOREIGN PATENT DOCUMENTS

GB  2 383 152 A  6/2003

OTHER PUBLICATIONS

International Preliminary Report dated Dec. 6, 2007 (8 pages).
International Preliminary Report dated Dec. 6, 2007 (7 pages).

(Continued)

*Primary Examiner*—Wei Y Zhen
*Assistant Examiner*—Junchun Wu
(74) *Attorney, Agent, or Firm*—Osha • Liang LLP

(57) ABSTRACT

A method for analyzing a target system that includes generating a characteristics model using a schema defining a domain, obtaining a plurality of characteristics from the target system using a characteristics extractor, wherein the plurality of characteristics is associated with the characteristics model storing each of the plurality of characteristics in a characteristics store, and analyzing the target system by issuing at least one query to the characteristics store to obtain an analysis result.

19 Claims, 7 Drawing Sheets

OTHER PUBLICATIONS

PCT International Search Report dated Jan. 4, 2006 for PCT/US2005/018004 (4 pages).

PCT International Search Report dated Jan. 4, 2006 for PCT/US2005/018008 (4 pages).

PCT International Search Report dated Jan. 23, 2006 for PCT/US/2005/018003 (4 pages).

Sartipi, K. et al.; "A Pattern Matching Framework for Software Architecture Recovery and Restructuring"; Proceedings IWPC'00; 8th International Workshop on Program Comprehension, Jun. 10, 2000, pp. 1-11 (11 pages).

Lange, C. et al.; "Comparing Graph-based Program Comprehension Tools to Relational Database-based Tools"; Program Comprehension, 2001; IWPC 2001 Proceedings; 9th International Workshop on May 12-13, 2001, Piscataway, NJ; IEEE 2001; pp. 209-218 (10 pages).

Sartipi, K. et al.; "A Graph Pattern Matching Approach to Software Architecture Recovery"; Proceedings IEEE International Conference on Software Maintenance; ICSM-2001, Florence, Italy, Nov. 7-9, 2001; pp. 408-419 (12 pages).

Jarzabek, S.; "Design of Flexible Static Program Analyzers with PQL"; IEEE Transactions on Software Engineering, IEEE Service Center, vol. 24, No. 3, Mar. 1, 1998; pp. 197-215 (19 pages).

Paul, S. et al.; "Source Code Retrieval Using Program Patterns"; Computer-Aided Software Engineering, 1992, Proceedings, Fifth International Workshop, Montreal, Quebec, Canada, Jul. 6-10, 1992; IEEE Computer Science, Jul. 6, 1992; pp. 92-105 (11 pages).

Masiero, P. et al.; "Legacy Systems Reengineering Using Software Patterns"; Computer Science Society, 1999, Proceedings SCCC '99; XIX International Conference of the Chilean Talca, Chile, Nov. 11-13, 1999; IEEE Computer Science; pp. 160-169 (10 pages).

International Search Report dated Feb. 15, 2006 (3 pages).

Atkins, David L.; "Version Sensitive Editing: Change History as a Programming Tool"; System Configuration Management; ECOOP '98, SCM-8 Symposium, Proceedings 1998, Berlin, Germany; pp. 146-157, 1998 (12 pages).

Prof. Victor V. Martynov, EHU; "SEMPL Semantic Patterns Language"; Summary Chapter from the book "Foundations of Semantic Coding", pp. 128-138, EHU, 2001 (9 pages).

"Hammurapi Group"; pp. 1-7.

Kamran Sartipi; "Software Architecture Recovery Based on Pattern Matching"; School of Computer Science, University of Waterloo; Proceedings of the International Conference on Software Maintenance (ICSM'03); IEEE Computer Society (4 pages).

Aldrich, et al; "Architectural Reasoning in ArchJava"; Department of Computer Science and Engineering; University of Washington; 2002; pp. 1-34.

"Structural Analysis for Java"; Mar. 1, 2004 (2 pages).

Lovatt, et al.; "A Pattern Enforcing Compiler (PEC) for Java: Using the Compiler"; Department of Computing, Macquarie University; 2005 Australian Computer Society, Inc.; (10 pages).

Hallem, et al.; "Uprooting Software Defects at the Source"; Instant Messaging, vol. 1, No. 8, Nov. 2003; pp. 1-9.

"Fixing Software on the Assembly Line" An Overview of Coverity's Static Code Analysis Technology; (26 pages).

"CAST Application Intelligence Platform Empowering Application Management"; CAST The Application Intelligence Company; Oct. 2004 (2 pages).

Agitar Data Sheet; "Agitator & Management Dashboard"; Agitar Software 2003-2005; (4 pages).

Ellsworth et al; "JUnit+Jtest =Automated Test Case Design and Static Analysis"; (3 pages).

Carriere et al.; "Assessing Design Quality From a Software Architectural Perspective"; OOPSLA '97 Workshop on Object-Oriented Design Quality; Oct. 5, 1997 (4 pages).

"J2EE Code Validation Preview for WebSphere Studio"; (2 pages).

"SQL Compiler (for Java)"; (8 pages).

Hassan et al.; "Architecture Recovery of Web Applications"; The Guide to Computing Literature; International Conference on Software Engineering; 2002; (12 pages).

* cited by examiner

METHOD AND APPARATUS FOR GENERATING A CHARACTERISTICS MODEL FOR A PATTERN-BASED SYSTEM DESIGN ANALYSIS USING A SCHEMA

CROSS-REFERENCE TO RELATED APPLICATIONS

The present application contains subject matter that may be related to the subject matter in the following U.S. applications filed on May 20, 2005, and assigned to the assignee of the present application: "Method and Apparatus for Tracking Changes in a System" (Ser. No. 11/133,831); "Method and Apparatus for Transparent Invocation of a Characteristics Extractor for Pattern-Based System Design Analysis" (Ser. No. 11/134,154); "Method and Apparatus for Generating Components for Pattern-Based System Design Analysis Using a Characteristics Model" Ser. No. 11/133,717; "Method and Apparatus for Pattern-Based System Design Analysis" Ser. No. 11/134,062; "Method and Apparatus for Cross-Domain Querying in Pattern-Based System Design Analysis" Ser. No. 11/133,507; "Method and Apparatus for Pattern-Based System Design Analysis Using a Meta Model" Ser. No. 11/134,021 and "Pattern Query Language" Ser. No. 11/133,660.

BACKGROUND

As software technology has evolved, new programming languages and increased programming language functionality has been provided. The resulting software developed using this evolving software technology has become more complex. The ability to manage the quality of software applications (including design quality and architecture quality) is becoming increasingly more difficult as a direct result of the increasingly complex software. In an effort to manage the quality of software applications, several software development tools and approaches are now available to aid software developers in managing software application quality. The following is a summary of some of the types of quality management tools currently available.

One common type of quality management tool is used to analyze the source code of the software application to identify errors (or potential errors) in the source code. This type of quality management tool typically includes functionality to parse the source code written in a specific programming language (e.g., Java™, C++, etc.) to determine whether the source code satisfies one or more coding rules (i.e., rules that define how source code in the particular language should be written). Some quality management tools of the aforementioned type have been augmented to also identify various coding constructs that may result in security or reliability issues. While the aforementioned type of quality management tools corrects coding errors, it does not provide the software developer with any functionality to verify the quality of the architecture of software application.

Other quality management tools of the aforementioned type have been augmented to verify that software patterns have been properly implemented. Specifically, some quality management tools of the aforementioned type have been augmented to allow the software developer to indicate, in the source code, the type of software pattern the developer is using. Then the quality management tool verifies, during compile time, that the software pattern was used/implemented correctly.

In another implementation of the aforementioned type of quality management tools, the source code of the software is parsed and the components (e.g., classes, interfaces, etc.) extracted from the parsing are subsequently combined in a relational graph (i.e., a graph linking all (or sub-sets) of the components). In a subsequent step, the software developer generates an architectural design, and then compares the architectural design to the relational graph to determine whether the software application conforms to the architectural pattern. While the aforementioned type of quality management tool enables the software developer to view the relationships present in the software application, it does not provide the software developer with any functionality to conduct independent analysis on the extracted components.

Another common type of quality management tool includes functionality to extract facts (i.e., relationships between components (classes, interfaces, etc.) in the software) and subsequently displays the extracted facts to the software developer. While the aforementioned type of quality management tool enables the software developer to view the relationships present in the software application, it does not provide the developer with any functionality to independently query the facts or any functionality to extract information other than facts from the software application.

Another common type of quality management tool includes functionality to extract and display various statistics (e.g., number of lines of code, new artifacts added, software packages present, etc.) of the software application to the software developer. While the aforementioned type of quality management tool enables the software developer to view the current state of the software application, it does not provide the developer with any functionality to verify the quality of the architecture of the software application.

SUMMARY

In general, in one aspect, the invention relates to a method for analyzing a target system, comprising generating a characteristics model using a schema defining a domain, obtaining a plurality of characteristics from the target system using a characteristics extractor, wherein the plurality of characteristics is associated with the characteristics model, storing each of the plurality of characteristics in a characteristics store, and analyzing the target system by issuing at least one query to the characteristics store to obtain an analysis result.

In general, in one aspect, the invention relates to a system, comprising a characteristics model defining at least one artifact and a plurality of characteristics associated with the at least one artifact, wherein the characteristics model is generated using a schema defining a domain, a target system comprising at least one of the plurality of characteristics defined in the characteristics model, at least one characteristics extractor configured to obtain at least one of the plurality of characteristics from the target system, a characteristics store configured to store the at least one of the plurality of characteristics obtained from the target system, and a query engine configured to analyze the target system by issuing at least one query to the characteristics store and configured to obtain an analysis result in response to the at least one query.

In general, in one aspect, the invention relates to a computer readable medium comprising software instructions for analyzing a target system, comprising software instructions to generate a characteristics model using a schema defining a domain, obtain a plurality of characteristics from the target system using a characteristics extractor, wherein the plurality of characteristics is associated with the characteristics model, store each of the plurality of characteristics in a characteristics store, and analyze the target system by issuing at least one query to the characteristics store to obtain an analysis result.

Other aspects of the invention will be apparent from the following description and the appended claims.

DETAILED DESCRIPTION

Figure 1:
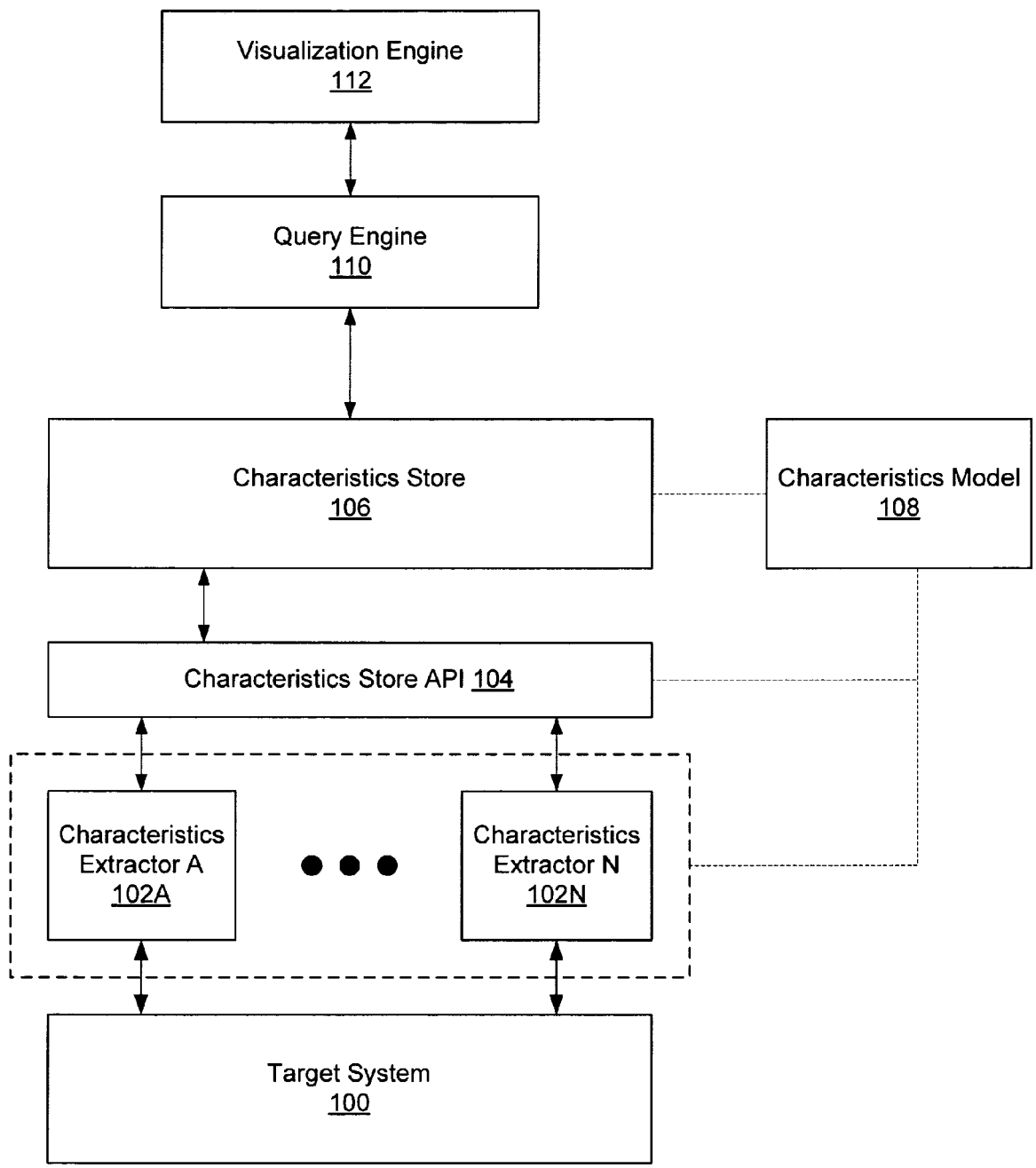
FIG. 1 shows a system in accordance with one embodiment of the invention.

Exemplary embodiments of the invention will be described with reference to the accompanying drawings. Like items in the drawings are shown with the same reference numbers.

In the exemplary embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for pattern-based system design analysis. More specifically, embodiments of the invention provide a method and apparatus for using one or more characteristics models, one or more characteristics extractors, and a query engine configured to query the characteristics of a target system to analyze the system design. Embodiments of the invention provide the software developer with a fully configurable architectural quality management tool that enables the software developer to extract information about the characteristics of the various artifacts in the target system, and then issue queries to determine specific details about the various artifacts including, but not limited to, information such as: number of artifacts of the specific type present in the target system, relationships between the various artifacts in the target system, the interaction of the various artifacts within the target system, the patterns that are used within the target system, etc. Further, one or more embodiments of the invention provide a method and apparatus for automatically generating the characteristics model from a schema (e.g., an XML schema) defining a domain (discussed below).

FIG. 1 shows a system in accordance with one embodiment of the invention. The system includes a target system (100) (i.e., the system that is to be analyzed) and a number of components used in the analysis of the target system. In one embodiment of the invention, the target system (100) may correspond to a system that includes software, hardware, or a combination of software and hardware. More specifically, embodiments of the invention enable a user to analyze specific portions of a system or the entire system. Further, embodiments of the invention enable a user to analyze the target system with respect to a specific domain (discussed below). Accordingly, the target system (100) may correspond to any system under analysis, where the system may correspond to the entire system including software and hardware, or only a portion of the system (e.g., only the hardware portion, only the software portion, a sub-set of the hardware or software portion, or any combination thereof). As shown in FIG. 1, the system includes the following components to aid in the analysis of the target system: one or more characteristics extractors (e.g., characteristics extractor A (102A), characteristics extractor N (102N)), a characteristics store application programming interface (API) (104), a characteristics store (106), a characteristics model (108), a query engine (110), and visualization engine (112). Each of these components is described below.

Figure 2:
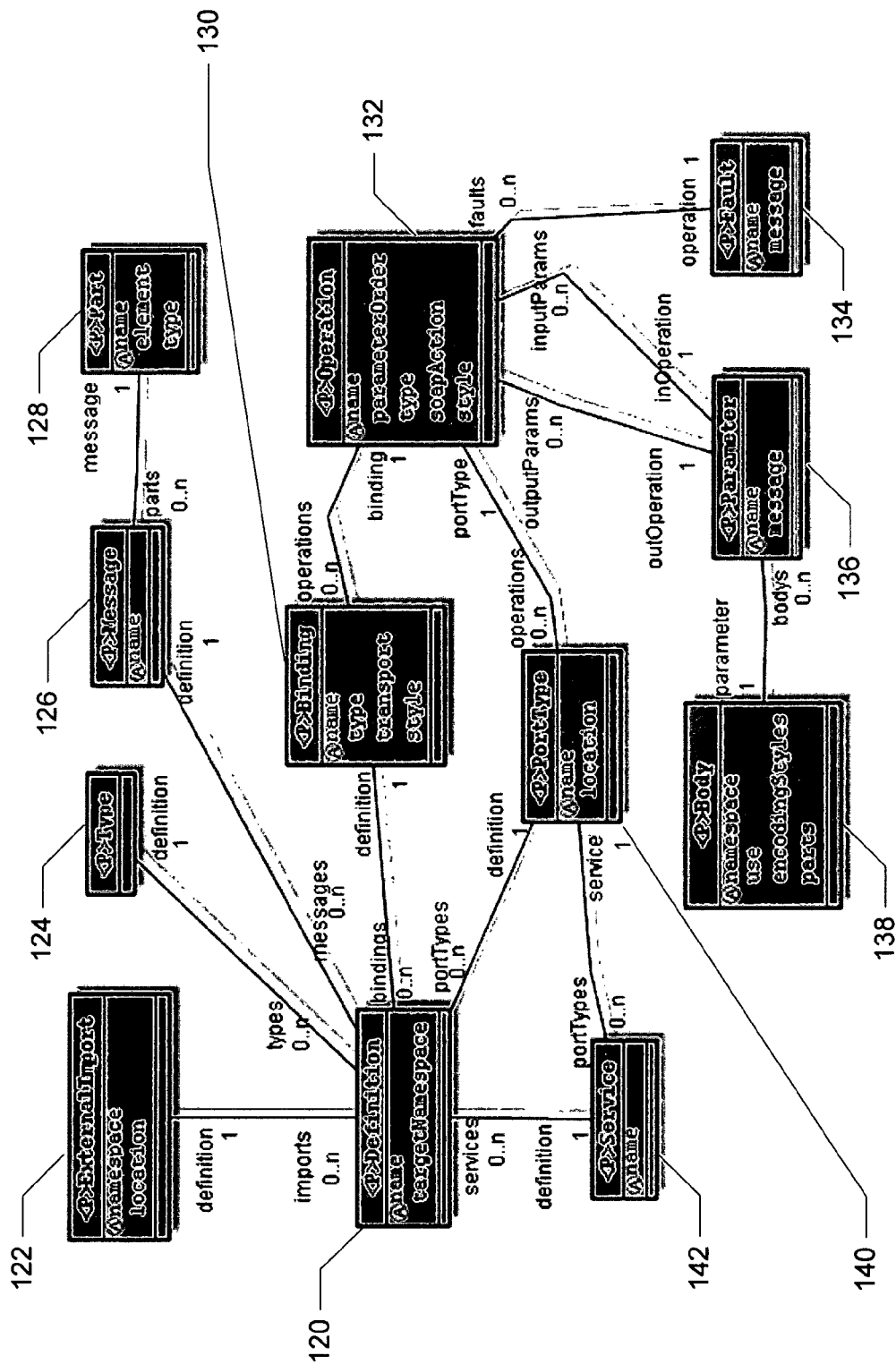
FIG. 2 shows a characteristics model in accordance one embodiment of the invention.

In one embodiment of the system, the characteristics model (108) describes artifacts (i.e., discrete components) in a particular domain. In one embodiment of the invention, the domain corresponds to any grouping of "related artifacts" (i.e., there is a relationship between the artifacts). Examples of domains include, but are not limited to, a Java™ 2 Enterprise Edition (J2EE) domain (which includes artifacts such as servlets, filters, welcome file, error page, etc.), a networking domain (which includes artifacts such as web server, domain name server, network interface cards, etc), and a DTrace domain (described below). In one embodiment of the invention, each characteristics model includes one or more artifacts, one or more relationships describing the interaction between the various artifacts, and one or more characteristics that describe various features of the artifact. An example of a characteristics model (108) is shown in FIG. 2. Those skilled in the art will appreciate that the system may include more than one characteristics model (108).

In one embodiment of the invention, the use of a characteristics model (108) enables a user to analyze the target system (100) with respect to a specific domain. Further, the use of multiple characteristics models allows the user to analyze the target system (100) across multiple domains. In addition, the use of multiple characteristics models allows the user to analyze the interaction between various domains on the target system (100).

In one embodiment of the invention, the characteristics model (108) is generated from a schema defining the domain. Embodiments detailing the generation of the characteristics model (108) from a schema defining the domain are described in FIGS. 4 and 5 below.

In one embodiment of the invention, the characteristics extractors (e.g., characteristics extractor A (102A), characteristics extractor N (102N)) are used to obtain information about various artifacts (i.e., characteristics) defined in the characteristics model (108). In one embodiment of the invention, the characteristics extractors (characteristics extractor A (102A), characteristics extractor B (102N)) are generated manually using the characteristics model (108).

In one embodiment of the invention, the characteristics extractor (e.g., characteristics extractor A (102A), characteristics extractor B (102N)) corresponds to an agent loaded on the target system (100) that is configured to monitor and obtain information about the artifacts in the target system (100). Alternatively, the characteristics extractor (e.g., characteristics extractor A (102A), characteristics extractor B (102N)) may correspond to an interface that allows a user to manually input information about one or more artifacts in the target system (100). In another embodiment of the invention, the characteristics extractor (e.g., characteristics extractor A (102A), characteristics extractor B (102N)) may correspond to a process (or system) configured to obtain information about one or more artifacts in the target system (100) by monitoring network traffic received by and sent from the target system (100). In another embodiment of the invention, the characteristics extractor (e.g., characteristics extractor A (102A), characteristics extractor B (102N)) may correspond to a process (or system) configured to obtain information about one or more artifacts in the target system (100) by sending requests (e.g., pinging, etc.) for specific pieces of information about artifacts in the target system (100) to the target system (100), or alternatively, sending requests to the target system and then extracting information about the artifacts from the responses received from target system (100). Those skilled in the art will appreciate that different types of characteristics extractors may be used to obtain information about artifacts in the target system (100).

Those skilled in the art will appreciate that each characteristics extractor (or set of characteristics extractors) is associated with a particular characteristics model (108). Thus, each characteristics extractor typically only retrieves information about artifacts described in the characteristics model with which the characteristics extractor is associated. Furthermore, if there are multiple characteristics models in the system, then each characteristics model may be associated with one or more characteristics extractors.

The information about the various artifacts in the target system (100) obtained by the aforementioned characteristics extractors (e.g., characteristics extractor A (102A), characteristics extractor N (102N)) is stored in the characteristics store (106) via the characteristic store API (104). In one embodiment of the invention, characteristics store API (104) provides an interface between the various characteristics extractors (characteristics extractor A (102A), characteristics extractor N (102N)) and the characteristics store (106). Further, the characteristics store API (104) includes information about where in the characteristics store (106) each characteristic obtained from the target system (100) should be stored.

In one embodiment of the invention, the characteristics store (106) corresponds to any storage that includes functionality to store characteristics in a manner that allows the characteristics to be queried. In one embodiment of the invention, the characteristics store (106) may correspond to a persistent storage device (e.g., hard disk, etc). In one embodiment of the invention, the characteristics store (106) corresponds to a relational database that may be queried using a query language such as Structure Query Language (SQL). Those skilled in the art will appreciate that any query language may be used. In one embodiment of the invention, if the characteristics store (106) is a relational database, then the characteristics store (106) includes a schema associated with the characteristics model (108) that is used to store the characteristics associated with the particular characteristics model (108). Those skilled in the art will appreciate that, if there are multiple characteristics models, then each characteristics model (108) may be associated with a separate schema.

In one embodiment of the invention, if the characteristics store (106) is a relational database that includes a schema associated with the characteristics model (108), then the characteristics store API (104) includes the necessary information to place characteristics obtained from target system (100) in the appropriate location in the characteristics store (106) using the schema.

In one embodiment of the invention, the query engine (110) is configured to issue queries to the characteristics store (106). In one embodiment of the invention, the queries issued by the query engine (110) enable a user (e.g., a system developer, etc.) to analyze the target system (100). In particular, in one embodiment of the invention, the query engine (110) is configured to enable the user to analyze the presence of specific patterns in the target system as well as the interaction between various patterns in the target system.

In one embodiment of the invention, a pattern corresponds to a framework that defines how specific components in the target system (100) should be configured (e.g., what types of information each component should manage, what interfaces should each component expose), and how the specific components should communicate with each other (e.g., what data should be communicated to other components, etc.). Patterns are typically used to address a specific problem in a specific context (i.e., the software/system environment in which the problem arises). Said another way, patterns may correspond to a software architectural solution that incorporates best practices to solve a specific problem in a specific context.

Continuing with the discussion of FIG. 1, the query engine (110) may also be configured to issue queries about interaction of specific patterns with components that do not belong to a specific pattern. Further, the query engine (110) may be configured to issue queries about the interaction of components that do not belong to any patterns.

In one embodiment of the invention, the query engine (110) may include pre-specified queries and/or enable to the user to specify custom queries. In one embodiment of the invention, both the pre-specified queries and the custom queries are used to identify the presence of one or more patterns and/or the presence of components that do not belong to a pattern in the target system (100).

In one embodiment of the invention, the pre-specified queries and the custom queries are specified using a Pattern Query Language (PQL). In one embodiment of the invention, PQL enables the user to query the artifacts and characteristics of the artifacts stored in the characteristics store (106) to determine the presence of a specific pattern, specific components of a specific pattern, and/or other components that are not part of a pattern, within the target system (100).

In one embodiment of the invention, the query engine (110) may include information (or have access to information) about the characteristics model (108) that includes the artifact and/or characteristics being queried. Said another way, if the query engine (110) is issuing a query about a specific artifact, then the query engine (110) includes information (or has access to information) about the characteristics model to which the artifact belongs. Those skilled in the art will appreciate that the query engine (110) only requires information about the particular characteristics model (108) to the extent the information is required to issue the query to the characteristics store (106).

Those skilled in the art will appreciate that the query engine (110) may include functionality to translate PQL queries (i.e., queries written in PQL) into queries written in a query language understood by the characteristics store (106) (e.g., SQL). Thus, a query written in PQL may be translated into an SQL query prior to being issued to the characteristics store (106). In this manner, the user only needs to understand the artifacts and/or characteristics that the user wishes to search for and how to express the particular search using PQL. The user does not need to be concerned with how the PQL query is handled by the characteristics store (106).

Further, in one or more embodiments of the invention, PQL queries may be embedded in a programming language such as Java™, Groovy, or any other programming language capable of embedding PQL queries. Thus, a user may embed one or more PQL queries into a program written in one of the aforementioned programming languages. Upon execution, the program issues one or more PQL queries embedded within the program and subsequently receives and processes the results prior to displaying them to the user. Those skilled in the art will appreciate that the processing of the results is performed using functionality of the programming language in which the PQL queries are embedded.

In one embodiment of the invention, the results of the individual PQL queries may be displayed using the visualization engine (112). In one embodiment of the invention, the visualization engine (112) is configured to output the results of the queries on a display device (i.e., monitor, printer, projector, etc.).

As discussed above, each characteristics model defines one or more artifacts, one or more relationships between the artifacts, and one or more characteristics for each artifact. The following is an example of a Web Service Definition Language (WSDL) characteristics model. In the example, the WSDL characteristics model includes the following attributes: Definition, ExternalImport, Type, Message, Part, Binding, Operation, PortType, Fault, Parameter, Body, and Service.

The following is a WSDL characteristics model in accordance with one embodiment of the invention.

```
                      WSDL Characteristics Model
 1 persistent class Definition {
 2     string name;
 3     string targetNamespace;
 4     references ExternalImport imports (0,n) inverse definition (1,1);
 5     references Type types (0,n) inverse definition (1,1);
 6     references Message messages (0,n) inverse definition (1,1);
 7     references Binding bindings (0,n) inverse definition (1,1);
 8     references PortType portTypes (0,n) inverse definition (1,1);
 9     references Service services (0,n) inverse definition (1,1);
10     PRIMARY KEY (name);
11 }
12
13 persistent class ExternalImport{
14     string namespace;
15     string location;
16 }
17
18 persistent class Type { }
19
20 persistent Message {
21     string name;
22     references Part parts (0,n) inverse message (1,1);
23     PRIMARY KEY (name);
24 }
25
26 persistent class Binding {
27     string name;
28     string type;
29     string transport;
30     string style;
31     references Operation operations (0,n) inverse binding (1,1);
32     PRIMARY KEY (name);
33 }
34
35 persistent class Operation {
36     string name;
37     string parameterOrder;
38     string type;
39     string soapAction;
40     string style;
41     references Fault faults (0,n) inverse operation (1,1);
42     references Parameter inputParams (0,n) inverse inOperation (1,1);
43     references Parameter outputParams (0,n) inverse outOperation (1,1);
44     PRIMARY KEY (name);
45 }
46
47 persistent class Fault {
48     string name;
49     string message;
50     PRIMARY KEY (name);
51 }
52
53 persistent class Parameter {
54     string name;
55     string message;
56     references Body bodys (0,n) inverse parameter (1,1);
57     PRIMARY KEY (name);
58 }
59
60 persistent class Body {
61     string namespace;
```

```
                      -continued
                      WSDL Characteristics Model
62     string use;
63     string encodingStyles;
64     string parts;
65     PRIMARY KEY (namespace);
66 }
67
68 persistent class PortType {
69     string name;
70     string location;
71     references Operation operations (0,n) inverse portType (1,1);
72     PRIMARY KEY (name);
73 }
74
75 persistent class Service {
76     string name;
77     references portTypes (0,n) inverse service (1,1);
78     PRIMARY KEY (name);
79 }
80
81
82 persistent class Part {
83     string name;
84     string element;
85     string type'
86     PRIMARY KEY (name);
87 }
```

In the above WSDL Characteristics Model, the Definition artifact is defined in lines 1-11, the ExternalImport artifact defined in lines 13-16, the Type artifact is defined in line 18, the Message artifact is defined in lines 20-24, the Binding artifact is defined in lines 26-33, the Operation artifact is defined in lines 35-45, the Fault artifact is defined in 47-51, the Parameter artifact is defined in lines 53-58, the Body artifact is defined in lines 60-66, the PortType artifact is defined in lines 68-72, the Service artifact is defined in lines 75-79, and the Part artifact is defined in lines 82-87.

A graphical representation of the aforementioned WSDL Characteristics Model is shown in FIG. 2. Specifically, the graphical representation of the WSDL characteristics model shows each of the aforementioned artifacts, characteristics associated with each of the aforementioned artifacts, and the relationships (including cardinality) among the artifacts. In particular, box (120) corresponds to the Definition artifact, box (122) corresponds to the ExternalImport artifact, box (124) corresponds to the Type artifact, box (126) corresponds to the Message artifact, box (128) corresponds to the Part artifact, box (130) corresponds to the Binding artifact, box (132) corresponds to the Operation artifact, box (134) corresponds to the Fault artifact, box (136) corresponds to the Parameter artifact, box (138) corresponds to the Body artifact, box (140) corresponds to the PortType artifact, and box (142) corresponds to the Service artifact.

Figure 3:
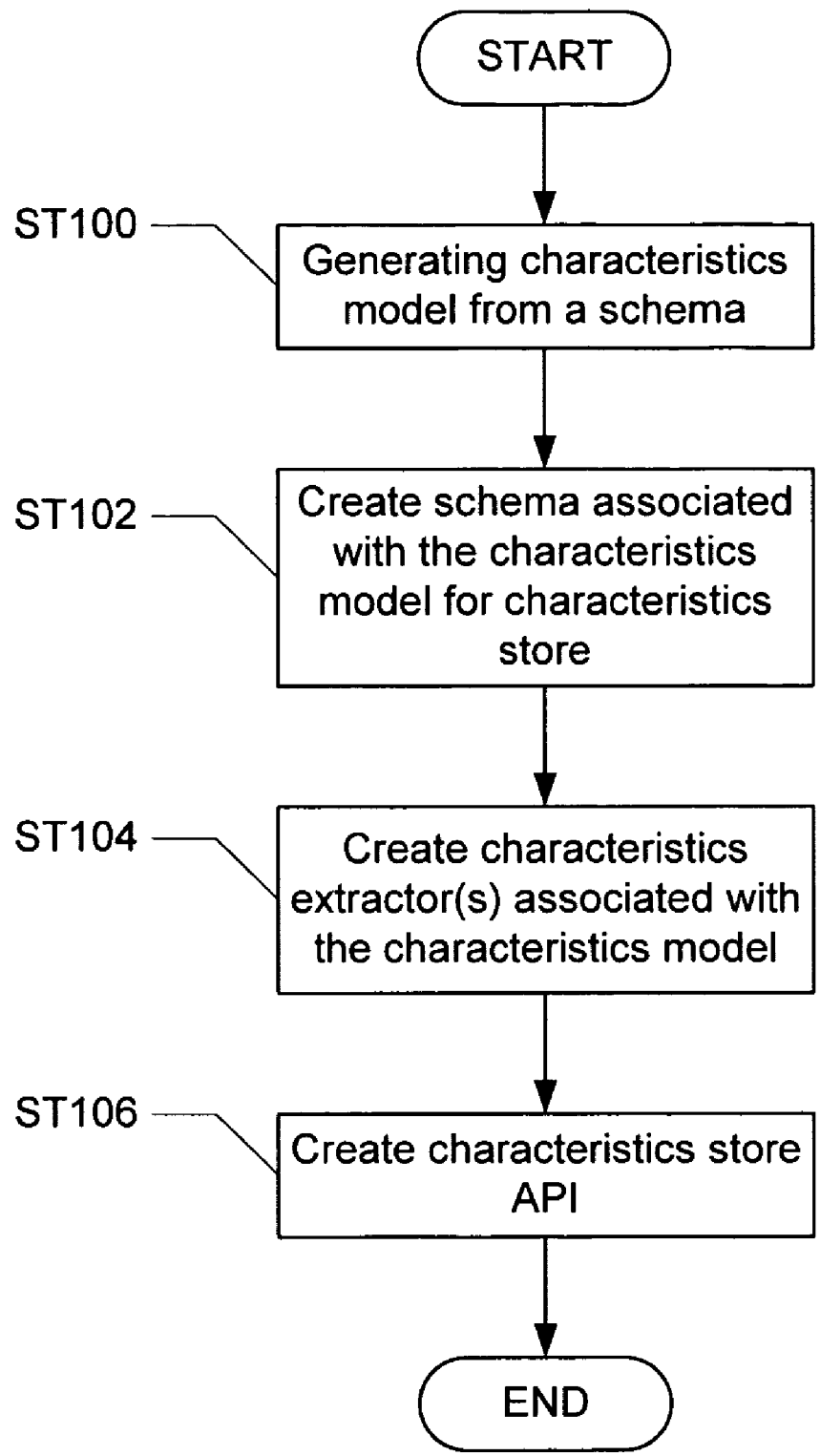
FIGS. 3 through 6 show flowcharts in accordance with one embodiment of the invention.

FIG. 3 shows a flowchart in accordance with one embodiment of the invention. Initially, a characteristics model is generated from a schema (ST100). The process of generating the characteristics model is discussed in FIGS. 4 and 5. Continuing with the discussion of FIG. 3, a schema for the characteristics store is subsequently created and associated with characteristics model (ST102). One or more characteristics extractors associated with characteristics model are subsequently created (ST104). Finally, a characteristics store API is created (ST106). In one embodiment of the invention, creating the characteristics store API includes creating a mapping between characteristics obtained by the characteristics extractors and tables defined by the schema configured to store the characteristics in the characteristics store.

Those skilled in the art will appreciate that ST100-ST106 may be repeated for each characteristics model. In addition, those skilled in the art will appreciate that once a characteristics store API is created, the characteristics store API may only need to be modified to support additional schemas in the characteristics data store and additional characteristics extractors. Alternatively, each characteristics model may be associated with a different characteristics store API.

Figure 4:
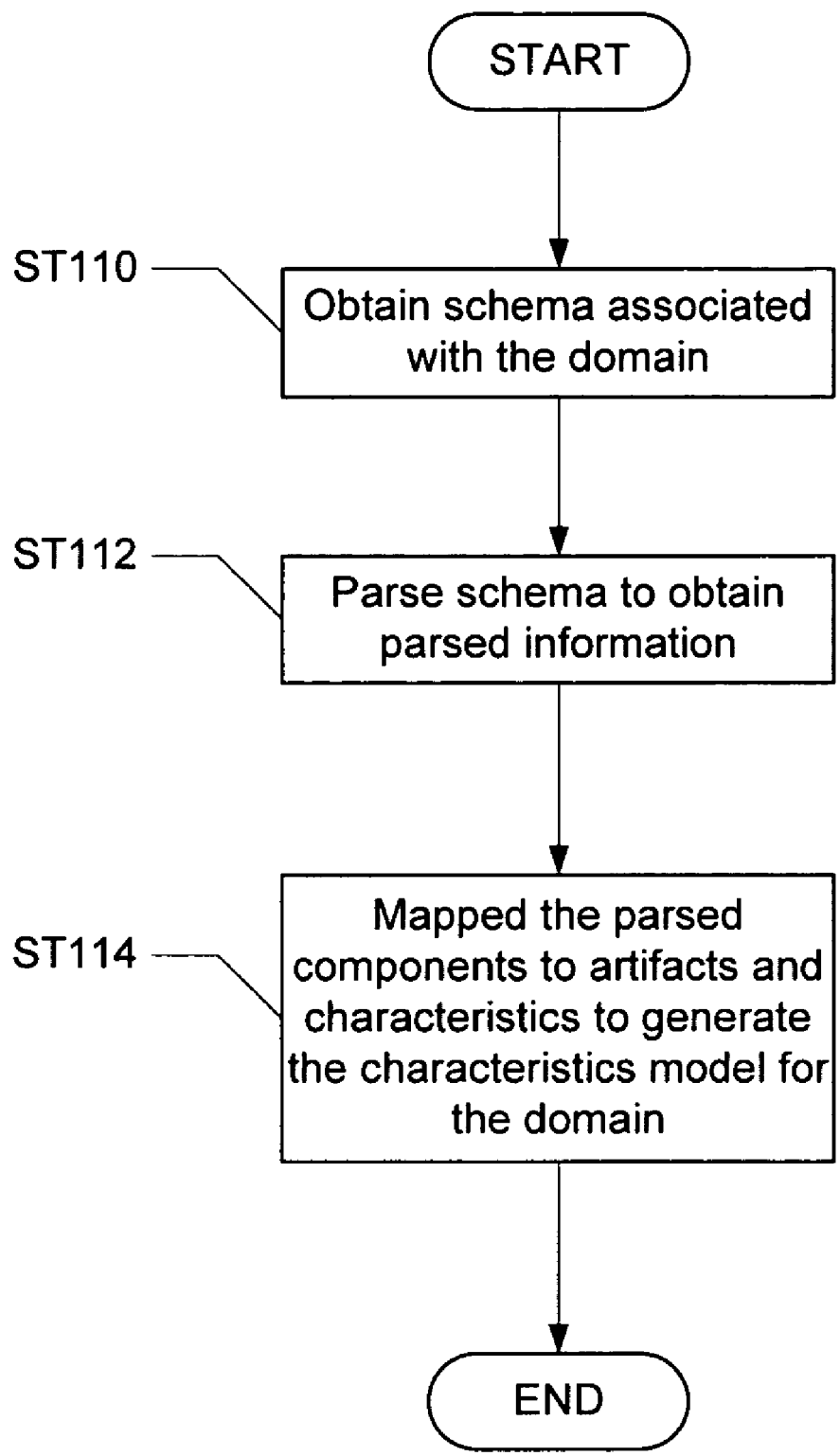

As discussed above, embodiments of the invention provide a method and apparatus for generating a characteristics model from a schema defining a domain. FIG. 4 shows a flowchart describing a method for generating a characteristics model using a schema defining a domain in accordance with one embodiment of the invention. Initially, the schema defining the domain is obtain (ST110). In one embodiment of the invention, the schema is defined using a schema standard such as eXtensible Mark-Language Schema Definition (XSD).

SD is a standard created by the World Wide Web Consortium (W3C) that specifies how to formally describe the elements in an XML document. Thus, one could define a domain, such as a WSDL domain in an XML document, using XSD. The following is an example of an XML document defining the WSDL domain using XSD.

| Schema for WSDL described using XSD |
|---|
| 1    <xs:schema xmlns:xs="http://www.w3.org/2001/XMLSchema" |
| 2              xmlns:wsdl="http://schemas.xmlsoap.org/wsdl/" |
| 3              targetNamespace="http://schemas.xmlsoap.org/wsdl/" |
| 4              elementFormDefault="qualified" > |
| 5 |
| 6    <xs:complexType mixed="true" name="tDocumentation" > |
| 7      <xs:sequence> |
| 8        <xs:any minOccurs="0" maxOccurs="unbounded" processContents="lax" /> |
| 9      </xs:sequence> |
| 10   </xs:complexType> |
| 11 |
| 12   <xs:complexType name="tDocumented" > |
| 13     <xs:annotation> |
| 14       <xs:documentation> |
| 15       This type is extended by component types to allow them to be |
| 16 documented |
| 17       </xs:documentation> |
| 18     </xs:annotation> |
| 19     <xs:sequence> |
| 20       <xs:element name="documentation" type="wsdl:tDocumentation" |
| 21 minOccurs="0" /> |
| 22     </xs:sequence> |
| 23   </xs:complexType> |
| 24 |
| 25   <xs:complexType name="tExtensibleAttributesDocumented" abstract="true" > |
| 26     <xs:complexContent> |
| 27       <xs:extension base="wsdl:tDocumented" > |
| 28         <xs:annotation> |
| 29           <xs:documentation> |
| 30           This type is extended by component types to allow attributes from |
| 31 other namespaces to be added. |
| 32           </xs:documentation> |
| 33         </xs:annotation> |
| 34         <xs:anyAttribute namespace="##other" processContents="lax" /> |
| 35       </xs:extension> |
| 36     </xs:complexContent> |
| 37   </xs:complexType> |
| 38 |
| 39   <xs:complexType name="tExtensibleDocumented" abstract="true" > |
| 40     <xs:complexContent> |
| 41       <xs:extension base="wsdl:tDocumented" > |
| 42         <xs:annotation> |
| 43           <xs:documentation> |
| 44           This type is extended by component types to allow elements from |
| 45 other namespaces to be added. |
| 46           </xs:documentation> |
| 47         </xs:annotation> |
| 48         <xs:sequence> |
| 49           <xs:any namespace="##other" minOccurs="0" maxOccurs="unbounded" |
| 50 processContents="lax" /> |
| 51         </xs:sequence> |
| 52       </xs:extension> |
| 53     </xs:complexContent> |
| 54   </xs:complexType> |
| 55 |
| 56   <xs:element name="definitions" type="wsdl:tDefinitions" > |
| 57     <xs:key name="message" > |
| 58       <xs:selector xpath="wsdl:message" /> |
| 59       <xs:field xpath="@name" /> |
| 60     </xs:key> |
| 61     <xs:key name="portType" > |

| Schema for WSDL described using XSD |
|---|

```
62          <xs:selector xpath="wsdl:portType" />
63          <xs:field xpath="@name" />
64        </xs:key>
65        <xs:key name="binding" >
66          <xs:selector xpath="wsdl:binding" />
67          <xs:field xpath="@name" />
68        </xs:key>
69        <xs:key name="service" >
70          <xs:selector xpath="wsdl:service" />
71          <xs:field xpath="@name" />
72        </xs:key>
73        <xs:key name="import" >
74          <xs:selector xpath="wsdl:import" />
75          <xs:field xpath="@namespace" />
76        </xs:key>
77      </xs:element>
78
79      <xs:group name="anyTopLevelOptionalElement" >
80        <xs:annotation>
81          <xs:documentation>
82          Any top level optional element allowed to appear more then once - any
83 child of definitions element except wsdl:types. Any extensibility element is
84 allowed in any place.
85          </xs:documentation>
86        </xs:annotation>
87        <xs:choice>
88          <xs:element name="import" type="wsdl:tImport" />
89          <xs:element name="types" type="wsdl:tTypes" />
90          <xs:element name="message"   type="wsdl:tMessage" >
91            <xs:unique name="part" >
92              <xs:selector xpath="wsdl:part" />
93              <xs:field xpath="@name" />
94            </xs:unique>
95          </xs:element>
96          <xs:element name="portType" type="wsdl:tPortType" />
97          <xs:element name="binding"   type="wsdl:tBinding" />
98          <xs:element name="service"   type="wsdl:tService" >
99            <xs:unique name="port" >
100             <xs:selector xpath="wsdl:port" />
101             <xs:field xpath="@name" />
102           </xs:unique>
103         </xs:element>
104       </xs:choice>
105     </xs:group>
106
107     <xs:complexType name="tDefinitions" >
108       <xs:complexContent>
109         <xs:extension base="wsdl:tExtensibleDocumented" >
110           <xs:sequence>
111             <xs:group ref="wsdl:anyTopLevelOptionalElement"   minOccurs="0"
112 maxOccurs="unbounded" />
113           </xs:sequence>
114           <xs:attribute name="targetNamespace" type="xs:anyURI" use="optional" />
115
116           <xs:attribute name="name" type="xs:NCName" use="optional" />
117         </xs:extension>
118       </xs:complexContent>
119     </xs:complexType>
120
121     <xs:complexType name="tImport" >
122       <xs:complexContent>
123         <xs:extension base="wsdl:tExtensibleAttributesDocumented" >
124           <xs:attribute name="namespace" type="xs:anyURI" use="required" />
125           <xs:attribute name="location" type="xs:anyURI" use="required" />
126         </xs:extension>
127       </xs:complexContent>
128     </xs:complexType>
129
130     <xs:complexType name="tTypes" >
131       <xs:complexContent>
132         <xs:extension base="wsdl:tExtensibleDocumented" />
133       </xs:complexContent>
134     </xs:complexType>
135
136     <xs:complexType name="tMessage" >
137       <xs:complexContent>
138         <xs:extension base="wsdl:tExtensibleDocumented" >
```

-continued

Schema for WSDL described using XSD

```
139         <xs:sequence>
140            <xs:element name="part" type="wsdl:tPart" minOccurs="0"
141  maxOccurs="unbounded" />
142         </xs:sequence>
143         <xs:attribute name="name" type="xs:NCName" use="required" />
144       </xs:extension>
145     </xs:complexContent>
146   </xs:complexType>
147
148   <xs:complexType name="tPart" >
149     <xs:complexContent>
150       <xs:extension base="wsdl:tExtensibleAttributesDocumented" >
151         <xs:attribute name="name" type="xs:NCName" use="required" />
152         <xs:attribute name="element" type="xs:QName" use="optional" />
153         <xs:attribute name="type" type="xs:QName" use="optional" />
154       </xs:extension>
155     </xs:complexContent>
156   </xs:complexType>
157
158   <xs:complexType name="tPortType" >
159     <xs:complexContent>
160       <xs:extension base="wsdl:tExtensibleAttributesDocumented" >
161         <xs:sequence>
162            <xs:element name="operation" type="wsdl:tOperation" minOccurs="0"
163  maxOccurs="unbounded" />
164         </xs:sequence>
165         <xs:attribute name="name" type="xs:NCName" use="required" />
166       </xs:extension>
167     </xs:complexContent>
168   </xs:complexType>
169
170   <xs:complexType name="tOperation" >
171     <xs:complexContent>
172       <xs:extension base="wsdl:tExtensibleDocumented" >
173         <xs:sequence>
174         <xs:choice>
175            <xs:group ref="wsdl:request-response-or-one-way-operation" />
176            <xs:group ref="wsdl:solicit-response-or-notification-operation" />
177
178         </xs:choice>
179         </xs:sequence>
180         <xs:attribute name="name" type="xs:NCName" use="required" />
181         <xs:attribute name="parameterOrder" type="xs:NMTOKENS" use="optional" />
182
183       </xs:extension>
184     </xs:complexContent>
185   </xs:complexType>
186
187   <xs:group name="request-response-or-one-way-operation" >
188     <xs:sequence>
189       <xs:element name="input" type="wsdl:tParam" />
190       <xs:sequence minOccurs='0' >
191         <xs:element name="output" type="wsdl:tParam" />
192            <xs:element name="fault" type="wsdl:tFault" minOccurs="0"
193  maxOccurs="unbounded" />
194       </xs:sequence>
195     </xs:sequence>
196   </xs:group>
197
198   <xs:group name="solicit-response-or-notification-operation" >
199     <xs:sequence>
200       <xs:element name="output" type="wsdl:tParam" />
201         <xs:sequence minOccurs='0' >
202            <xs:element name="input" type="wsdl:tParam" />
203            <xs:element name="fault" type="wsdl:tFault" minOccurs="0"
204  maxOccurs="unbounded" />
205         </xs:sequence>
206     </xs:sequence>
207   </xs:group>
208
209   <xs:complexType name="tParam" >
210     <xs:complexContent>
211       <xs:extension base="wsdl:tExtensibleAttributesDocumented" >
212         <xs:attribute name="name" type="xs:NCName" use="optional" />
213         <xs:attribute name="message" type="xs:QName" use="required" />
214       </xs:extension>
215     </xs:complexContent>
```

| | Schema for WSDL described using XSD |
|---|---|
| 216 | `</xs:complexType>` |
| 217 | |
| 218 | `<xs:complexType name="tFault" >` |
| 219 | `  <xs:complexContent>` |
| 220 | `    <xs:extension base="wsdl:tExtensibleAttributesDocumented" >` |
| 221 | `      <xs:attribute name="name" type="xs:NCName" use="required" />` |
| 222 | `      <xs:attribute name="message" type="xs:QName" use="required" />` |
| 223 | `    </xs:extension>` |
| 224 | `  </xs:complexContent>` |
| 225 | `</xs:complexType>` |
| 226 | |
| 227 | `<xs:complexType name="tBinding" >` |
| 228 | `  <xs:complexContent>` |
| 229 | `    <xs:extension base="wsdl:tExtensibleDocumented" >` |
| 230 | `      <xs:sequence>` |
| 231 | `        <xs:element name="operation" type="wsdl:tBindingOperation"` |
| 232 | `minOccurs="0" maxOccurs="unbounded" />` |
| 233 | `      </xs:sequence>` |
| 234 | `      <xs:attribute name="name" type="xs:NCName" use="required" />` |
| 235 | `      <xs:attribute name="type" type="xs:QName" use="required" />` |
| 236 | `    </xs:extension>` |
| 237 | `  </xs:complexContent>` |
| 238 | `</xs:complexType>` |
| 239 | |
| 240 | `<xs:complexType name="tBindingOperationMessage" >` |
| 241 | `  <xs:complexContent>` |
| 242 | `    <xs:extension base="wsdl:tExtensibleDocumented" >` |
| 243 | `      <xs:attribute name="name" type="xs:NCName" use="optional" />` |
| 244 | `    </xs:extension>` |
| 245 | `  </xs:complexContent>` |
| 246 | `</xs:complexType>` |
| 247 | |
| 248 | `<xs:complexType name="tBindingOperationFault" >` |
| 249 | `  <xs:complexContent>` |
| 250 | `    <xs:extension base="wsdl:tExtensibleDocumented" >` |
| 251 | `      <xs:attribute name="name" type="xs:NCName" use="required" />` |
| 252 | `    </xs:extension>` |
| 253 | `  </xs:complexContent>` |
| 254 | `</xs:complexType>` |
| 255 | |
| 256 | `<xs:complexType name="tBindingOperation" >` |
| 257 | `  <xs:complexContent>` |
| 258 | `    <xs:extension base="wsdl:tExtensibleDocumented" >` |
| 259 | `      <xs:sequence>` |
| 260 | `        <xs:element name="input" type="wsdl:tBindingOperationMessage"` |
| 261 | `minOccurs="0" />` |
| 262 | `        <xs:element name="output" type="wsdl:tBindingOperationMessage"` |
| 263 | `minOccurs="0" />` |
| 264 | `        <xs:element name="fault" type="wsdl:tBindingOperationFault"` |
| 265 | `minOccurs="0" maxOccurs="unbounded" />` |
| 266 | `      </xs:sequence>` |
| 267 | `      <xs:attribute name="name" type="xs:NCName" use="required" />` |
| 268 | `    </xs:extension>` |
| 269 | `  </xs:complexContent>` |
| 270 | `</xs:complexType>` |
| 271 | |
| 272 | `<xs:complexType name="tService" >` |
| 273 | `  <xs:complexContent>` |
| 274 | `    <xs:extension base="wsdl:tExtensibleDocumented" >` |
| 275 | `      <xs:sequence>` |
| 276 | `        <xs:element name="port" type="wsdl:tPort" minOccurs="0"` |
| 277 | `maxOccurs="unbounded" />` |
| 278 | `      </xs:sequence>` |
| 279 | `      <xs:attribute name="name" type="xs:NCName" use="required" />` |
| 280 | `    </xs:extension>` |
| 281 | `  </xs:complexContent>` |
| 282 | `</xs:complexType>` |
| 283 | |
| 284 | `<xs:complexType name="tPort" >` |
| 285 | `  <xs:complexContent>` |
| 286 | `    <xs:extension base="wsdl:tExtensibleDocumented" >` |
| 287 | `      <xs:attribute name="name" type="xs:NCName" use="required" />` |
| 288 | `      <xs:attribute name="binding" type="xs:QName" use="required" />` |
| 289 | `    </xs:extension>` |
| 290 | `  </xs:complexContent>` |
| 291 | `</xs:complexType>` |
| 292 | |

-continued

Schema for WSDL described using XSD

```
293    <xs:attribute name="arrayType" type="xs:string" />
294    <xs:attribute name="required" type="xs:boolean" />
295    <xs:complexType name="tExtensibilityElement" abstract="true" >
296      <xs:attribute ref="wsdl:required" use="optional" />
297    </xs:complexType>
298
299  </xs:schema>
```

In the above WSDL Schema, the Definition artifact is defined in lines 107-128, the ExternalImport artifact defined in lines 121-128, the Type artifact is defined in lines 130-134, the Message artifact is defined in lines 136-146, the Binding artifact is defined in lines 227-238, the Operation artifact is defined in lines 170-207, the Parameter artifact is defined in lines 209-216, the Fault artifact is defined in lines 218-225, the PortType artifact is defined in lines 158-168, and the Service artifact is defined in lines 272-282.

Continuing with the discussion of FIG. 4, the schema defining the domain may be parsed to obtain parsed information (ST112). In one embodiment of the invention, the parsed information corresponds to complexTypes, complexType attributes, and nest complexTypes if the schema is an XML document written in accordance with XSD. Those skilled in the art will appreciate that other heuristics may be used to map the parsed information to artifacts and characteristics within the characteristics model. Continuing with the discussion of FIG. 4, the parsed information is subsequently mapped to either an artifact or a characteristics (ST114). In this manner, the characteristics model is generated. In some cases the parsed information may include sufficient information to define relationships between the various artifacts as well as the cardinality of the relationships. Those skilled in the art will appreciate that the characteristics model generated using the method described in FIG. 4, may not be a complete characteristics model. For example, the characteristics model generated using the method described in FIG. 4 may not define all the relationships between the artifacts and the cardinality of each of the relationships. In such cases, the relationships and cardinality of each of the relationships may be input manually by the user.

Figure 5:
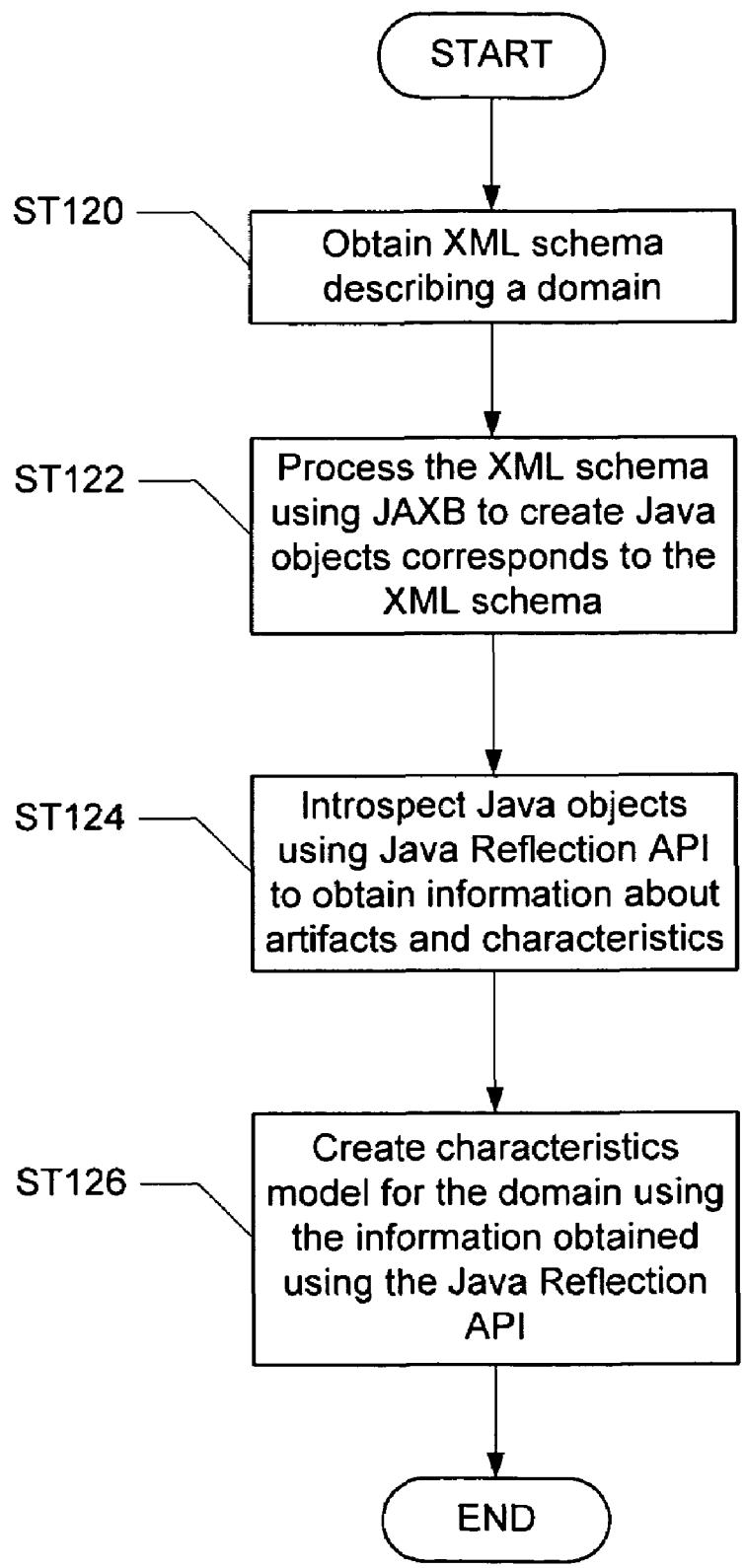

FIG. 5 shows a flowchart in accordance with one embodiment of the invention. More specifically, FIG. 5 describes a method for generating a characteristics model when the schema is an XML document. Initially, the schema defining the domain is obtained (ST120). The schema is subsequently processed by a Java™ Architecture for XML Binding (JAXB) tool to obtain Java™ objects (ST122). In one embodiment of the invention, the each of the Java™ objects corresponds to an artifact in the domain. Further, each of the Java™ objects includes one or more variables, where each of the variables corresponds to characteristics within the domain.

Continuing with the discussion of FIG. 5, the Java™ Reflection API is subsequently used to introspect the Java™ to obtain information about the artifacts and characteristics within the domain (ST124). More specifically, the Java™ Reflection API includes functionality to obtain information about: the class of each object, variables and constants used in the object, etc. In some cases, the Java™ Reflection API may also be used to obtain information about the relationships and cardinality of the relationships between the various artifacts. The ability the obtain information about the relationships and the cardinality of the relationships is typically dependent on the detail of the schema that defines the domain.

The information obtained from introspecting the Java™ objects created in ST122 is subsequently used to create the characteristics model corresponds to the domain defined by the schema (ST126). Those skilled in the art will appreciate that the information obtained from introspecting the Java™ object is equivalent to the information obtained from parsing the schema (defined above in FIG. 4).

Those skilled in the art will appreciate that the characteristics model generated using the methods described in FIGS. 4 and 5 may be modified to include additional artifacts and characteristics prior to using the characteristics models to analyze the target system.

Figure 6:
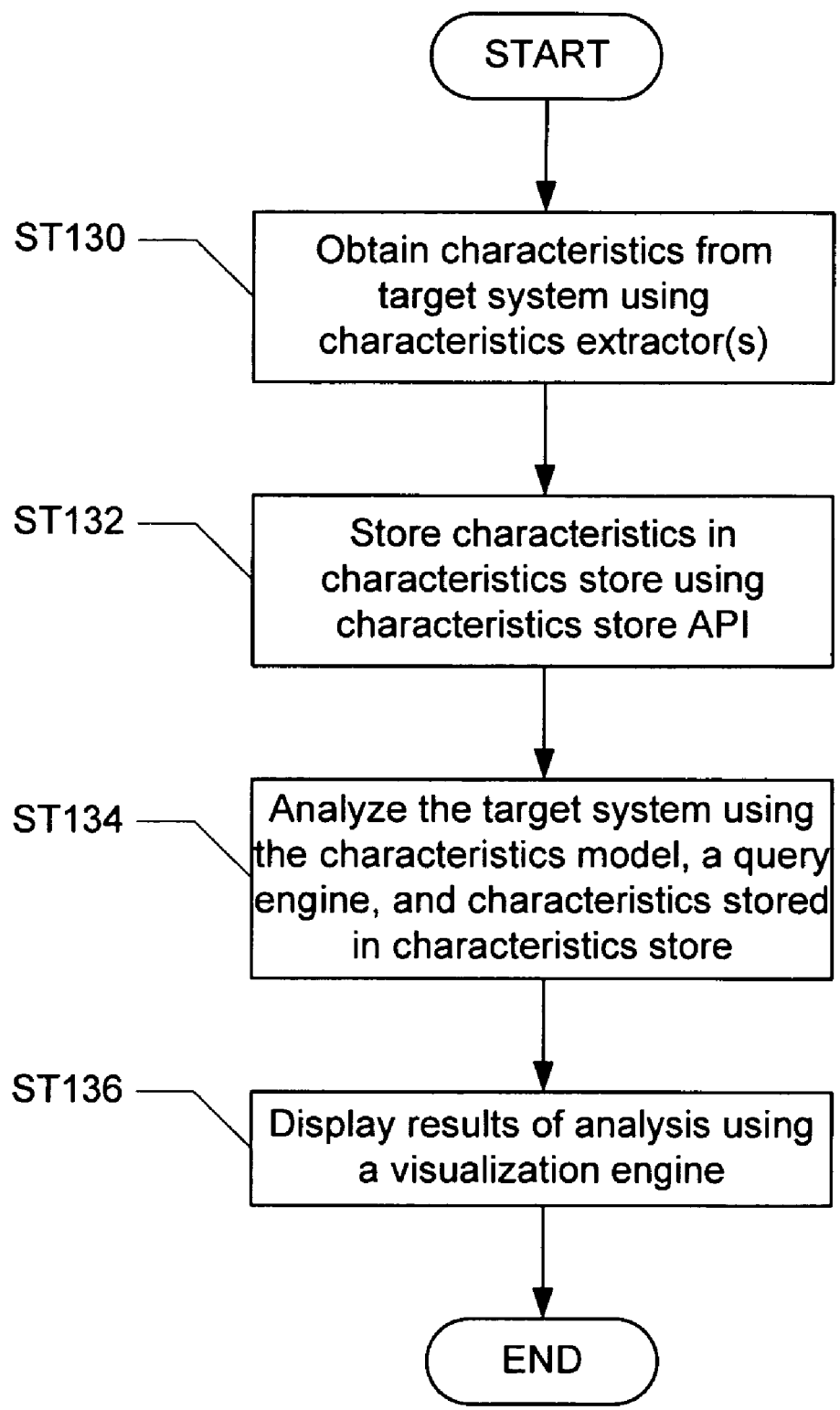

At this stage, the system is ready to analyze a target system. FIG. 6 shows a flowchart in accordance with one embodiment of the invention. Initially, characteristics are obtained from the target system using one or more characteristics extractors (ST130). In one embodiment of the invention, the characteristics extractors associated with a given characteristics model only obtain information about characteristics associated with the artifacts defined in the characteristics model.

Continuing with the discussion of FIG. 6, the characteristics obtained from the target system using the characteristics extractors are stored in the characteristics store using the characteristics store API (ST132). Once the characteristics are stored in the characteristics store, the target system may be analyzed using the characteristics model (or models), a query engine, and the characteristics stored in the characteristics store (ST134). In one embodiment of the invention, the user uses the query engine to issue queries to characteristics store. As discussed above, the query engine may include information (or have access to information) about the characteristics models currently being used to analyze the target system. The results of the analysis are subsequently displayed using a visualization engine (ST136).

Those skilled in the art will appreciate that ST130-ST132 may be performed concurrently with ST124-ST136. In addition, steps in FIG. 3, may be performed concurrently with the steps in FIG. 6.

Figure 7:
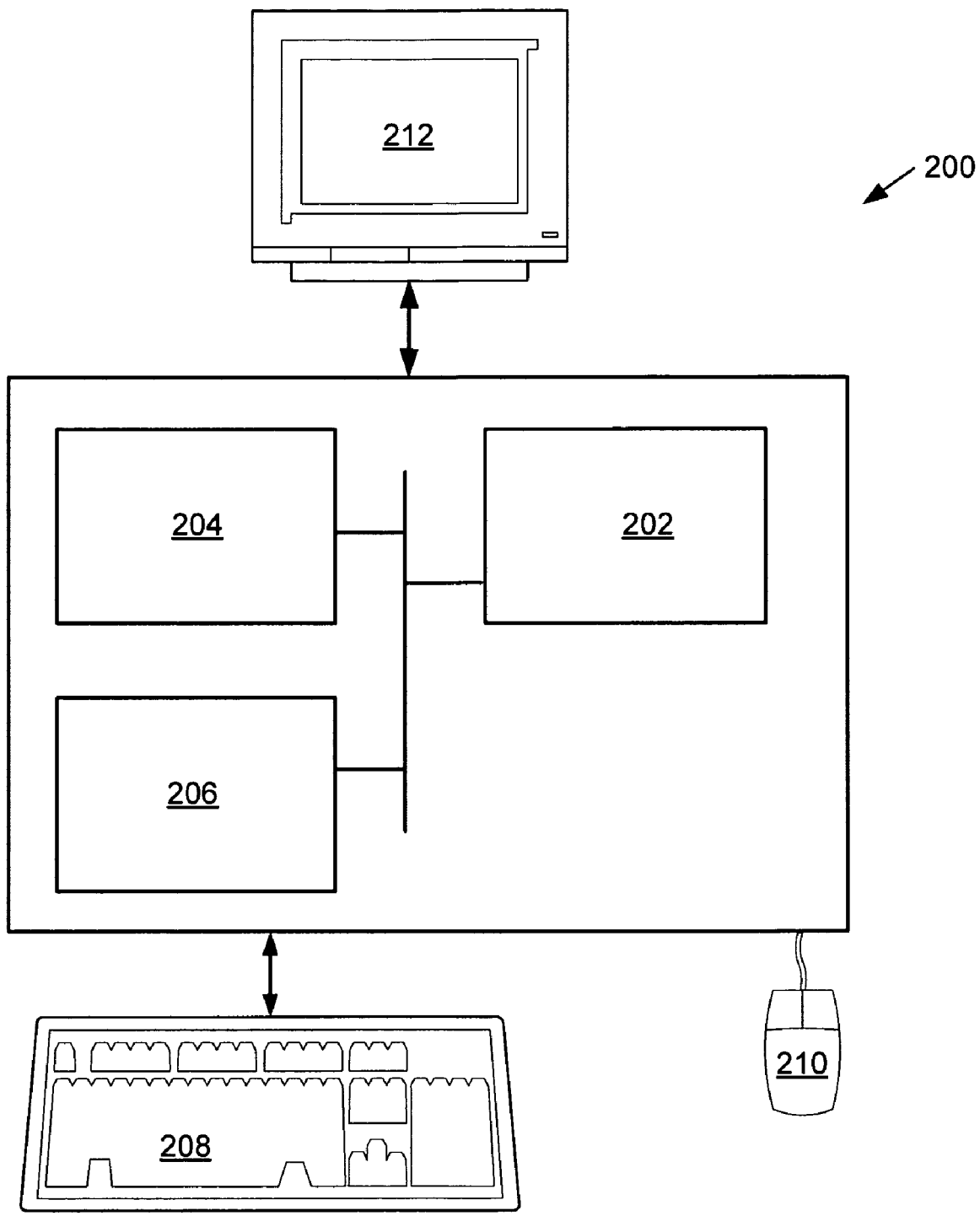
FIG. 7 shows a computer system in accordance with one embodiment of the invention.

An embodiment of the invention may be implemented on virtually any type of computer regardless of the platform being used. For example, as shown in FIG. 7, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a target system, comprising:
    generating a characteristics model using a schema defining a domain;
    obtaining a plurality of characteristics from a plurality of artifacts of the target system using a characteristics extractor, wherein the plurality of characteristics is associated with a plurality of artifacts of the characteristics model;
    storing each of the plurality of characteristics in a characteristics store; and
    analyzing, using the characteristics model, the target system by issuing at least one query to the characteristics store to obtain an analysis result,
    wherein the plurality of artifacts of the target system comprises at least one hardware artifact and at least one software artifact, and
    wherein generating the characteristics model comprises:
        obtaining the schema,
        parsing the schema to obtain a plurality of parsed information,
        mapping a first one of the plurality of parsed information to an artifact of the plurality of artifacts of the characteristics model,
        mapping a second one of the plurality of parsed information to a characteristic describing a feature of at least one artifact of the plurality of artifacts of the characteristics model, and
        mapping a third one of the plurality of parsed information to a relationship describing an interaction between at least two artifacts of the plurality of artifacts of the characteristics model.

2. The method of claim 1, further comprising:
    prior to obtaining the plurality of characteristics from the plurality of artifacts of the target system:
    generating the characteristics extractor associated with the characteristics model; and
    generating a characteristics store API associated with the characteristics model, wherein the characteristics extractor uses the characteristics store application programming interface (API) to store each of the plurality of characteristics in the characteristics store.

3. The method of claim 1, further comprising:
    displaying the analysis result.

4. The method of claim 1, wherein the schema is an extensible markup language (XML) schema.

5. The method of claim 4, wherein the XML schema is defined using XML schema definition (XSD).

6. The method of claim 1, wherein parsing the schema comprises:
    inputting the schema into a Java Architecture for XML binding (JAXB) tool;
    generating a plurality of objects by the JAXB tool using the schema; and
    introspecting the plurality of objects using a Java Reflection API to obtain the plurality of parsed information.

7. The method of claim 1, wherein the characteristics store comprises the schema, wherein the schema is associated with the characteristics model.

8. The method of claim 1, wherein the characteristics model defines a first artifact, a second artifact, a relationship between the first artifact and the second artifact, and at least one characteristics for the first artifact and the second artifact.

9. The method of claim 1, wherein the at least one query is defined using a pattern query language and wherein the pattern query language includes functionality to search for at least one pattern in the target system.

10. A system, comprising:
    a processor; and
    software instructions executable by the processor for:
        a characteristics model defining a plurality of artifacts and a plurality of characteristics associated with the plurality of artifacts, wherein the characteristics model is generated using a schema defining a domain;
        at least one characteristics extractor configured to obtain at least one of the plurality of characteristics from a plurality of artifacts of a target system;
        a characteristics store configured to store the at least one of the plurality of characteristics obtained from the plurality of artifacts of the target system; and
        a query engine configured to analyze the target system by issuing at least one query to the characteristics store and configured to obtain an analysis result in response to the at least one query,
    wherein the query engine is further configured to analyze the target system by using the characteristics model;
    wherein the plurality of artifacts of the target system comprises at least one of the plurality of characteristics defined in the characteristics model,
    wherein the target system comprises at least one hardware artifact and at least one software artifact, and
    wherein generating the characteristics model comprises:
        obtaining the schema;
        parsing the schema to obtain a plurality of parsed information,
        mapping a first one of the plurality of parsed information to an artifact of the plurality of artifacts of the characteristics model,
        mapping a second one of the plurality of parsed information to a characteristic describing a feature of at least one artifact of the plurality of artifacts of the characteristics model, and
        mapping a third one of the plurality of parsed information to a relationship describing an interaction between at least two artifacts of the plurality of artifacts of the characteristics model.

11. The system of claim 10, further, comprising:
    a characteristics store API, wherein the at least one characteristics extractor is configured to use the characteristics store API to store at least one of the plurality of characteristics obtained from the plurality of artifacts of the target system in the characteristics store, and wherein the characteristics store API is associated with the characteristics model.

12. The system of claim 10, further comprising:
    a visualization engine configured to display the analysis result.

13. The system of claim 10, wherein the schema is an extensible markup language (XML) schema.

14. The system of claim 13, wherein the XML schema is defined using XML schema definition (XSD).

15. The system of claim 10, wherein parsing the schema comprising:
- inputting the schema into a Java Architecture for XML binding (JAXB) tool;
- generating a plurality of objects by the JAXB tool using the schema; and
- introspecting the plurality of objects using a Java Reflection API to obtain the plurality of parsed information.

16. The system of claim 10, wherein the characteristics model defines a first artifact, a second artifact, a relationship between the first artifact and the second artifact, and at least one characteristics for the first artifact and the second artifact.

17. The system of claim 10, wherein the at least one query is defined using a pattern query language, wherein the pattern query language includes functionality to search for at least one pattern in the target system.

18. A computer readable medium comprising software instructions for analyzing a target system, comprising software instructions to:
- generate a characteristics model using a schema defining a domain;
- obtain a plurality of characteristics from a plurality of artifacts of the target system using a characteristics extractor, wherein the plurality of characteristics is associated with a plurality of artifacts of the characteristics model;
- store each of the plurality of characteristics in a characteristics store; and
- analyze, using the characteristics model, the target system by issuing at least one query to the characteristics store to obtain an analysis result, wherein the plurality of artifacts of the target system comprises at least one hardware artifact and at least one software artifact, and wherein generating the characteristics model comprises:
- obtaining the schema,
- parsing the schema to obtain a plurality of parsed information,
- mapping a first one of the plurality of parsed information to an artifact of the plurality of artifacts of the characteristics model,
- mapping a second one of the plurality of parsed information to a characteristic describing a feature of at least one artifact of the plurality of artifacts of the characteristics model, and
- mapping a third one of the plurality of parsed information to a relationship describing an interaction between at least two artifacts of the plurality of artifacts of the characteristics model.

19. The computer readable medium of claim 18, wherein parsing the schema comprises:
- inputting the schema into a Java Architecture for XML binding (JAXB) tool;
- generating a plurality of objects by the JAXB tool using the schema; and
- introspecting the plurality of objects using a Java Reflection API to obtain the plurality of parsed information.

* * * * *